United States Patent [19]

Behunin

[11] Patent Number: 5,033,966
[45] Date of Patent: Jul. 23, 1991

[54] CYCLIC STEREOPHONIC SOUND PATTERN METHOD AND APPARATUS FOR READING IMPROVEMENT

[76] Inventor: Stephen O. Behunin, 2115 Browning Ave., Salt Lake City, Utah 84108

[21] Appl. No.: 353,007

[22] Filed: May 17, 1989

[51] Int. Cl.⁵ ............................................. G09B 17/04
[52] U.S. Cl. .................................... 434/179; 434/178
[58] Field of Search ............... 434/178, 179, 236, 181, 434/182, 319; 600/27

[56] References Cited

U.S. PATENT DOCUMENTS

| | | | |
|---|---|---|---|
| 4,315,502 | 2/1982 | Gorges | 600/27 |
| 4,655,112 | 4/1987 | Mitarai | 84/649 X |
| 4,775,322 | 10/1988 | Behunin | 434/179 |

Primary Examiner—Robert Bahr
Assistant Examiner—J. L. Doyle
Attorney, Agent, or Firm—David R. Black; Jon C. Christiansen

[57] ABSTRACT

A reading method for reading text whereby the reader listens to a cyclic stereophonic sound pattern while reading text. The cyclic stereophonic sound pattern paces the reader's eye movement over the text. A decrease in the pitch of the stereophonic sound pattern reduces reader stress due to learning to read more quickly. The invention also includes reading improvement apparatus used in the practice of this method.

26 Claims, 8 Drawing Sheets

MAIN ROUTINE

CYCLIC STEREOPHONIC SOUND PATTERN METHOD AND APPARATUS FOR READING IMPROVEMENT

INTRODUCTION

This invention is an improvement to Cyclic Stereophonic Sound Pattern Method and Apparatus for Reading Improvement, U.S. Pat. No. 4,775,322, issued to Stephen O. Behunin.

This invention relates to both method and apparatus for the improvement of reading skills. The invention helps to establish correct eye movement over textual materials and paces such eye movement to increase reading speed. The invention also improves reading comprehension and retention.

The objectives of the invention are as follows:

1. Pacing

To increase the speed at which the reader reads textual materials by pacing the reader's eye movement. The typical reader tends to vocalize each word that is read. Often such vocalization is a silent subconscious vocalization of each word. The typical reader's mind is able to process words at a rate much greater than the rate at which he/she normally reads words vocally.

2. Optimum Eye Movement

To train and assist the reader in establishing eye movement which scans the textual material in the optimum pattern and minimizes the number of saccadic eye movements and eye fixations. To train and assist the reader in establishing optimal eye movement over the textal material, the reader may also follow the text with his or her hand.

3. Concentration

To improve the reader's ability to concentrate his/her senses on the task of reading. When concentration is improved, the reader's comprehension and retention are improved. When any of the reader's senses "wanders" or is distracted from the task of reading, his/her concentration is reduced. This invention trains and assists the reader in blocking out sounds that distract the sense of hearing and in focusing the sense of sight on the textual materials being read.

4. Reduce Reader Stress

To reduce the stress felt by the reader due to the increase in his/her rate of reading and to facilitate reader relaxation while increasing the rate of reading.

The above-identified objectives as well as other objectives, aspects and advantages of the invention will be clear to a person of ordinary skill in the art upon a study of this disclosure, including the appended claims.

SUMMARY OF INVENTION

The reading method of this invention is practiced by a reader by listening to a cyclic stereophonic sound pattern while reading text. The cyclic stereophonic sound pattern is created by panning a sound source. The rate of the cyclic stereophonic sound pattern can be increased, thus improving the reader's reading skills. The pitch of the cyclic stereophonic sound pattern can be simultaneously lowered to reduce the stress encountered by the reader in learning to read more quickly. The cyclic stereophonic sound pattern paces the reader's eye movement over the text. A reading improvement apparatus for the practice of this method is comprised of a cyclic stereophonic sound pattern and a listening means for the reader to listen to the cyclic stereophonic sound pattern.

The reading improvement apparatus of this invention can be a cyclic stereophonic sound pattern recorded in a medium from which the sound pattern can be heard by the reader of text either directly or with the aid of a machine. For example, the cyclic stereophonic sound pattern can be recorded in an audio tape which the reader listens to through the use of an audio tape player. Alternatively, the sound pattern can be synthesized at the time the reader listens to the sound pattern through the use of a synthesizing sound system. The means which allows the reader to listen to the cyclic stereophonic sound pattern can be any conventional means (such as an audio tape and audio tape player or a conventional synthesizer) known today or can be any means developed in the future which can accomplish such purpose.

DETAILED DESCRIPTION

The method of this invention involves listening to a cyclic stereophonic sound pattern while reading text. As used in this disclosure (including the appended claims), text means the printed or written words or other visual symbols which are read by the reader. The cyclic stereophonic sound pattern is an auditory pattern created by panning a sound source as described below. The cyclic stereophonic sound pattern can be constructed from any basic sonic texture (e.g. ocean waves, wind, tones, vocal harmonies or other sounds) or a combination of sonic textures. These sonic textures are referred to as "voices." Greater frequency of the sound waves creating the voice results in a higher pitch heard by a listener. Each voice can be presented in numerous pitches by varying the frequency of the sound waves. There is no "best mode" voice. Any choice thereof is a matter of preference to be decided by the reader (i.e. the listener). The inventor personally prefers ocean sounds and vocal harmonies. The cyclic stereophonic sound pattern provides a cyclic auditory pattern of left to right and then right to left which the eyes can follow visually by scanning the text left to right and then right to left. A single auditory cycle is left to right then right to left.

(Note: an equivalent cycle is right to left then left to right and such equivalent cycle is intended to be encompassed within the scope of the appended claims). Because the sound pattern is cyclic, the "left to right then right to left" auditory cycle is repeated continually over the period of time that the invention is in use. The cycle can be repeated using the same or different sound patterns (i.e. sound patterns constructed from different or varying voices).

Panning is used to create the cyclic stereophonic sound patterns of this invention. The process and technology of panning are known to persons of ordinary skill in the relevant art. Panning is commonly accomplished by using a complimentary pair of potentiometers connected to a common source and arranged to supply an attenuated signal on one side and a normal signal on the other side. The potentiometers share a common shaft which when rotated causes the above situations (i.e. attenuated signal and normal signal) to be exchanged one for the other in a smoothly varying fashion. The taper of the potentiometers is so arranged that as the shaft is rotated from one extreme position to the other (e.g. left to right) the sound moves from one of the loudspeakers to the other (e.g. left to right) in a manner which closely corresponds to the position of the shaft. Thus, when the shaft is turned to the center position, the sound appears to be located halfway between the two loudspeakers. The effect is similar when using headphones as the loudspeakers. Headphones are preferred in the practice of this invention.

By turning the shaft one way and then the other the sonic texture is moved across an approximately horizontal auditory trajectory which corresponds to the horizontal length of a typical line of printed text as viewed during the reading process. The cyclic stereophonic sound pattern is created by panning the sound source from left to right and then right to left (i.e. from one extreme to the other extreme and then back to the first extreme) to create the auditory cycle. Initially, the reader consciously causes his/her eye and hand movement to be paced by the cyclic stereophonic sound pattern. With time and practice, the reader's eye and hand movement becomes subconsciously paced by the cyclic stereophonic sound pattern. The sound pattern induces the eyes and hands to move with it and thus produces the regular patterns of eye and hand motion which are associated with the discipline of rapid reading. This induced motion is a form of synesthesia.

The panning effect described above can also be brought about by causing the sound presented to one loudspeaker or earpiece to be delayed relative to the other. The listener then hears the sound on the opposite side of center from the delayed site. The displacement from center is increased as the delay is increased. A combination of attenuation and delay can be used to produce motion of the voice away from the side to which they are applied. In addition, it is also possible to cause such motion by the judicious use of equalization. Since attenuation and delay are relative terms, it is obvious that amplification and advance can be used to produce the same results. The same applies to equalization.

The reader can vary the rate of panning to suit his or her reading level. The rate of panning means the rate at which the auditory cycle is repeated. As a reader's ability to read more quickly improves, the rate of panning can be increased. As the rate of the panning increases, the reader will experience more stress associated with his or her ability to read at the increased rate.

In the practice of this invention, the frequency of the sound pattern used in the cyclic stereophonic sound pattern can be reduced, thus lowering the pitch of the sound pattern. The pitch can be lowered while keeping the rate of cycles constant or while the rate of cycles is increased. By lowering the pitch heard by the reader, the reader experiences less stress encountered in the process of learning to read more quickly.

The apparatus used in the practice of this invention is any medium, device or machine capable of allowing the reader to listen to a cyclic stereophonic sound pattern while he/she is reading. Such devices can use any of a broad variety of methods to produce the cyclic stereophonic sound pattern. Examples include: prerecorded sound tapes, prerecorded sound tapes and tape player, electronic synthesizers and processors, digital memories and processors, etc., all of which can be used individually or in combination and can be controlled by suitable knobs, switches, etc. to operate at various rates, with differing sound textures, using wider or narrower scan widths, with varying frequency of pitches, etc. A person of ordinary skill in the art, after a study of this disclosure, will be able to practice the invention by using conventional technology to create and listen to cyclic stereophonic sound patterns. The cyclic stereophonic sound pattern can be listened to "live" as it is being created or it can be recorded in a medium (such as an audio tape) and be listened to at the reader's discretion. The cyclic stereophonic sound pattern can be listened to with more than two speakers. For example, a quadraphonic arrangement can be used and is within the scope of the appended claims. Also, the invention can be adapted to, and/or used in combination with, a computer (preferably a microcomputer) system. A computer system with music or audio capability can serve as the source of the sound pattern and the computer monitor (screen) can provide the text.

It is noted that, although the invention can be used on a continuing basis, it is contemplated that the invention will train and assist the reader in establishing the above-described reading techniques and procedures sufficiently to improve the reader's reading performance when reading without the assistance or use of the inventive apparatus.

Figure 1:
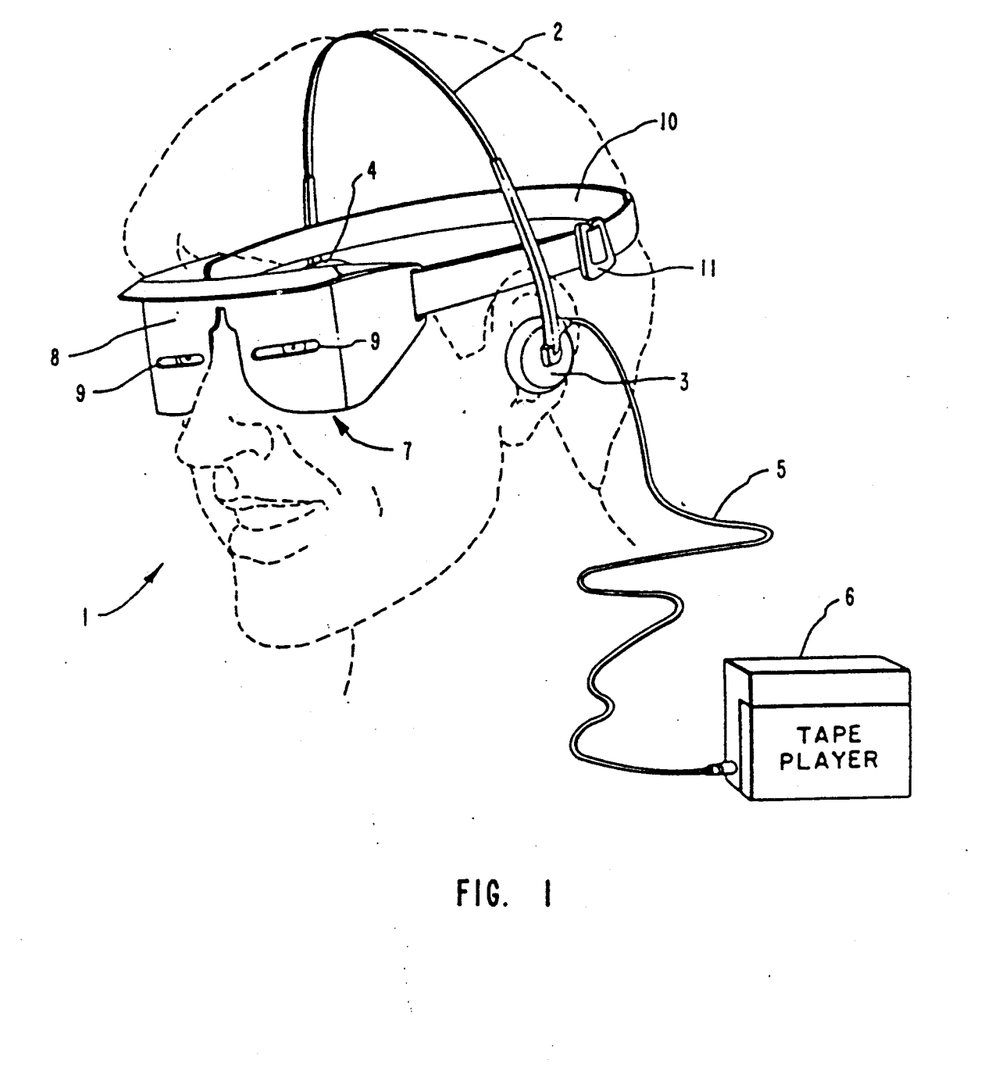
FIG. 1 depicts a reader listening to a cyclic stereophonic sound pattern through a headphone set. The headphone set is connected to an audio tape player that is playing a prerecorded tape capable of producing said cyclic stereophonic sound pattern and allowing the reader to adjust the volume. The voice of the sound pattern, the rate of cycles and any increase in the rate of cycles, as well as any variation in the pitch of the sound pattern are also prerecorded on the audio tape.

FIG. 1 depicts a reader (1) employing an embodiment of the invention. Headphone set (2) provides left speaker (3) and right speaker (4). Headphone set (2) is connected by line (5) to an audio tape player (6) which is playing an audio tape on which a cyclic stereophonic sound pattern is prerecorded. The voice of the sound pattern, the rate of cycles and any increase in the rate of cycles, as well as any variation in the pitch of the sound pattern, are also prerecorded on the audio tape. Reader (1) is also shown wearing stenopaic goggles (7) which include blinds (8) and have stenopaic slits (9). The goggles are not part of the invention but may be worn by the reader to improve concentration on the task of reading.

Figure 2:
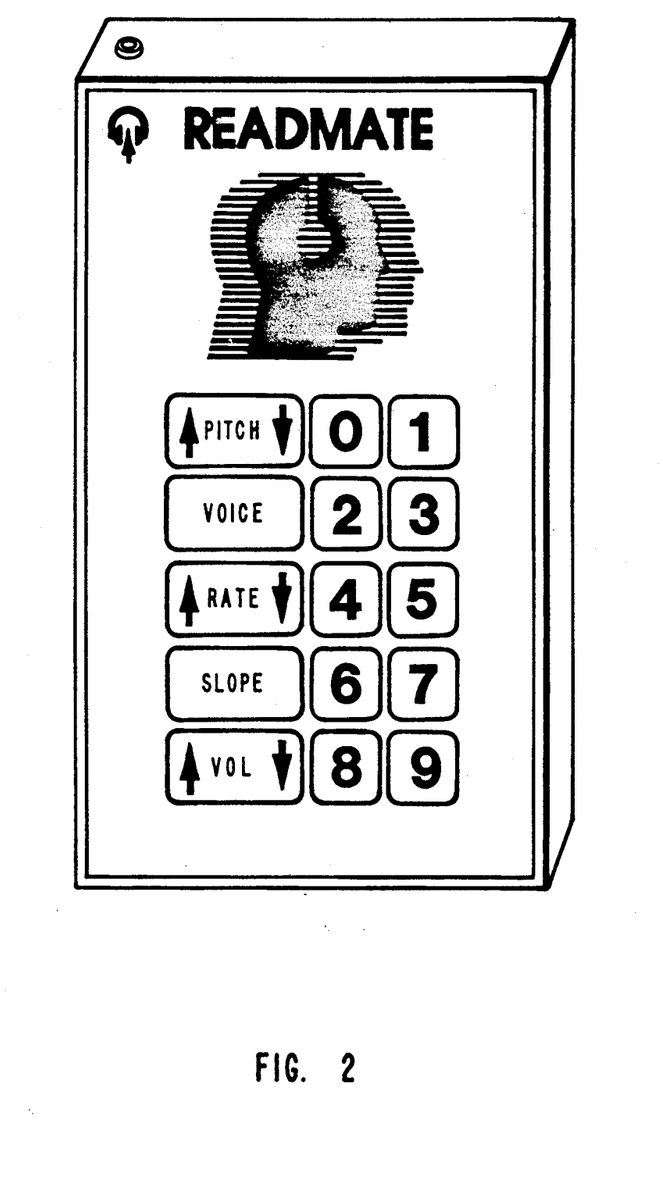
FIG. 2 depicts an alternative apparatus to the audio tape player adapted to produce said cyclic stereophonic sound pattern and to allow the reader to adjust said volume, the rate of cycles, pitch, voice, and rate at which the rate of cycles can be increased.

FIG. 2 depicts an alternative apparatus (1) to the audio tape player adapted to produce said cyclic stereophonic sound pattern. The apparatus (1) is adapted to accept a headphone jack in the same manner as an audio tape player. The apparatus also includes a keypad (Z) for user interaction. The keypad allows the reader to adjust said volume, the rate of cycles, pitch, voice, and rate at which the rate of cycles can be increased. In the use of either embodiment of the inventive apparatus, the reader listens to the cyclic stereophonic sound pattern through a left speaker and a right speaker as shown in FIG. 1. The cyclic stereophonic sound pattern has been created by panning a sound source from left to right then right to left, so the auditory cycle heard by the reader goes from left ear to right ear and then from right ear to left ear. This "left to right then right to left" auditory cycle is repeated continuously for so long as the reader listens to the sound pattern.

As reader (1) reads his text, his eye and hand movements are paced by the cyclic stereophonic sound pattern. As the sound goes from left to right, the reader's eyes move from left to right along the first line of text. As the sound goes from right to left, the reader's eyes move from right to left across the second line of text. With the next auditory cycle, the reader's eyes move from left to right across the second line of text (as the sound goes from left to right) and move from right to left across the third line of text (as the sound goes from right to left). As the sound travels from left to right and right to left in a cycle, the reader may follow the text with his or her hand to assist in the process of pacing the eyes while also engaging the sense of touch. The reading process and the auditory cycles continue in a similar manner. The speed of the cyclic stereophonic sound pattern (i.e. auditory cycles per minute or c.p.m.) sets the pace at which the reader reads the text. The speed of the cyclic stereophonic sound pattern may pace the reader at a pace which can prevent the vocalizing of words from interfering with a rapid reading process. A reader, who reads at a slow pace, may be able to improve his or her reading skills but still be able to vocalize the words. Thus, the reader reads at an increased speed or rate. As the reader improves, the speed of the cyclic stereophonic sound pattern can be increased (i.e. auditory cycles per minute can be increased). This increase of rate can be accomplished in a number of ways. The increase can be accomplished by providing the reader with a recording, or series of recordings of said cyclic stereophonic sound pattern on which are recorded a series of faster rates of the cyclic stereophonic sound patterns. The increase of rate can also be accomplished by providing the reader with an apparatus adapted to increase said cyclic stereophonic sound patterns. Generally, the reader should begin at about 20 to 40 c.p.m. and work from there up to 100 or 120 c.p.m. Of course, the reader is not limited to the foregoing speeds and can use faster (or slower) speeds depending upon the preferences and abilities of the individual reader.

As the reader's skills develop or if the reader desires to skim the text, the reader can "take in" more than a single line of text with each forward half cycle (i.e. the left to right half cycle). Some readers can even develop an ability to comprehend text "taken in" during the return half cycle (i.e. the right to left half cycle). Some readers may desire to skip lines while skimming the text.

The cyclic stereophonic sound pattern trains and assists the reader in establishing eye movement which scans the text in the optimum pattern and minimizes the number of saccadic eye movements and eye fixations. The cyclic stereophonic sound pattern also improves the ability of the reader to concentrate by blocking out auditory distractions.

When creating the cyclic stereophonic sound pattern by panning the sound source, the sound source can be panned with volume adjustments to add another dimension to the invention. For example, the sound source can be panned as follows:

(a) the sound source is panned from left to right (the forward half cycle);
(b) the volume of the sound source is decreased;
(c) the sound source is panned from right to left (the return half cycle); and
(d) the volume of the sound source is increased. In the minds of many readers such volume adjustments create an auditory impression which is visually described as an ellipse or helix. Eye movement corresponding thereto moves cyclically left to right then right to left across and down a page of text in an eliptical or helixical pattern. Such patterns facilitate very rapid reading of the text. This pattern can be enhanced by the judicious raising and lowering of the pitch of the sound pattern. The pitch can be increased until the tone is at the "top" of the helix and then lowered until the tone reaches the "bottom" of the helix. Then as the pitch is raised the cycle begins again.

It should be noted that other volume adjustment patterns can be used. For example, the volume can be increased in step (b) and decreased in step (d).

As the rate of cycles increases, the reader experiences stress in trying to read at a faster rate. In order to reduce stress felt by the reader as the rate of the cyclic stereophonic sound pattern increases, the overall pitch of the sound pattern can be lowered (i.e. the frequency of the sound pattern can be lowered). This can be accomplished by lowering the frequency of the sound waves of the voice resulting in a lower pitch. The lower pitch facilitates reading at a faster rate by creating a perception by the reader that the rate has been reduced. The overall pitch can be lowered while the rate of the cyclic stereophonic sound pattern remains constant or the overall pitch can be lowered as the rate of the cyclic stereophonic sound pattern is actually increased.

The inventive apparatus can take various forms. In one embodiment, as depicted in FIG. 1, the apparatus consists of an audio tape player capable of reproducing stereophonic sound to left and right loudspeakers or headphones. Headphones are preferred in the practice of this invention. The audio tape player plays a prerecorded tape to which the reader listens while reading text, prerecorded on the tape are cyclic stereophonic sound patterns. These sound patterns can remain constant or can be prerecorded with an increase in the rate of cycles adapted to improve the reader's reading performance. The tapes can also include a prerecorded variation of the pitch of the sound pattern. The pitch of the sound pattern may be lowered as the rate of cycles remains constant or as the rate of cycles is increased. In a case where the rate of cycles remains constant, the reader perceives that the rate of cycles has decreased. In a case where the rate of cycles is increased while the pitch of the sound pattern is lowered, the reader perceives that the rate has remained the same or in some cases that the rate of cycles has been decreased. This perception on the part of the reader reduces the stress of the reader accompanying the process of learning to read more quickly. The audio tapes can be presented in a variety of prerecorded voices. The overall volume of the sound pattern can be controlled by the conventional volume means incorporated into the audio tape player.

FIG. 2 depicts the inventive apparatus in its preferred embodiment. This apparatus is capable of allowing the reader to adjust the overall volume, select the voice of the sound pattern, select the rate of cycles of the sound pattern, adjust the rate of cycles, select the pitch of the sound pattern and adjust the pitch of the sound pattern.

Figure 3:
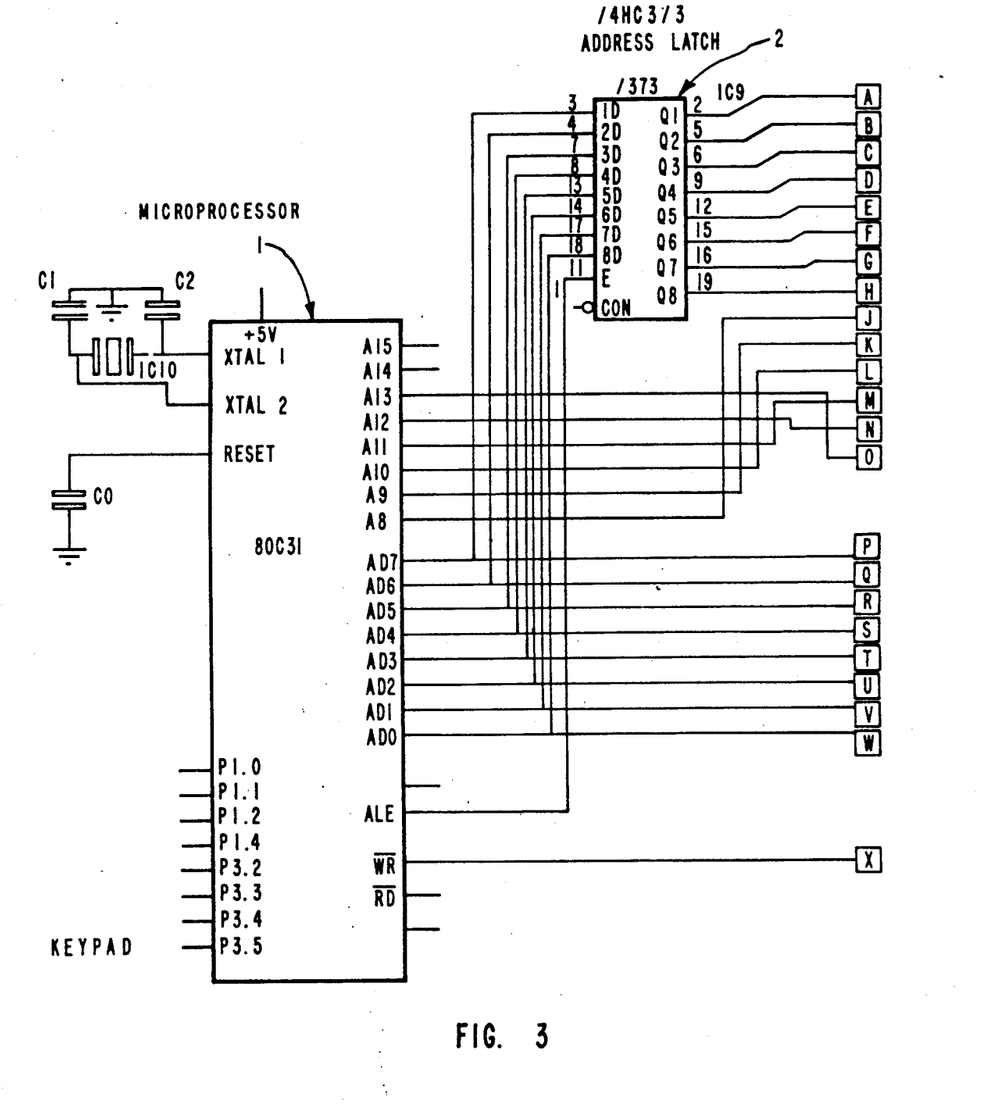
FIG. 3 depicts a schematic drawing of the hardware configuration of the alternative apparatus depicted in FIG. 2.

In addition, the apparatus is capable of automatically varying the rate of cycles and varying the pitch of the sound pattern. The apparatus comprises an Intel 80C31 microprocessor expanded mode system with 32K bytes of ROM (1). The ROM contains both the software that the microprocessor executes and the digitally recorded sounds which make up the various voices of the sound patterns. This system includes a 74HC373 address latch (2) which sends and retrieves information from the ROM and a 27C256 EPROM (3) into which has been programmed a variety of digitally recorded sounds used to produce the sound patterns as well as the programmed software necessary to use the apparatus. Added to the above identified microprocessing system is an AD7524 dual CMOS digital to analog converter (4) that converts digitally recorded sounds from the ROM into analog signals. These analog signals are then filtered and amplified and output to loud speakers or headphones. Also added to the system is a three pole low-pass filter (5) that has a cutoff frequency of 4 KHz and a −36 Db/decade roll off which removes the digital sampling frequency from the analog output. These filters operate to remove the digital sampling frequency and any other high frequency noise. A 20 key Keypad (shown in FIG. 2) is provided for user interaction and is connected to Port 1 and Port 3 of the microprocessor. The Keypad is polled as an X-Y matrix to locate a key press entered by the user. The signal pressed on the Keypad is then directed to the appropriate section of the apparatus for performance.

The amplifier output consists of a dual 50 mw audio amplifier (6) that provides electric current necessary to drive 32 ohm headphones (not shown).

The software for this embodiment of the inventive apparatus is comprised of three routines. As stated above, the software is programmed into the ROM. The invention is not limited to three routines. The tasks performed in routines can be divided into various subroutines. The invention is not limited to those routines set forth below.

Figure 4:
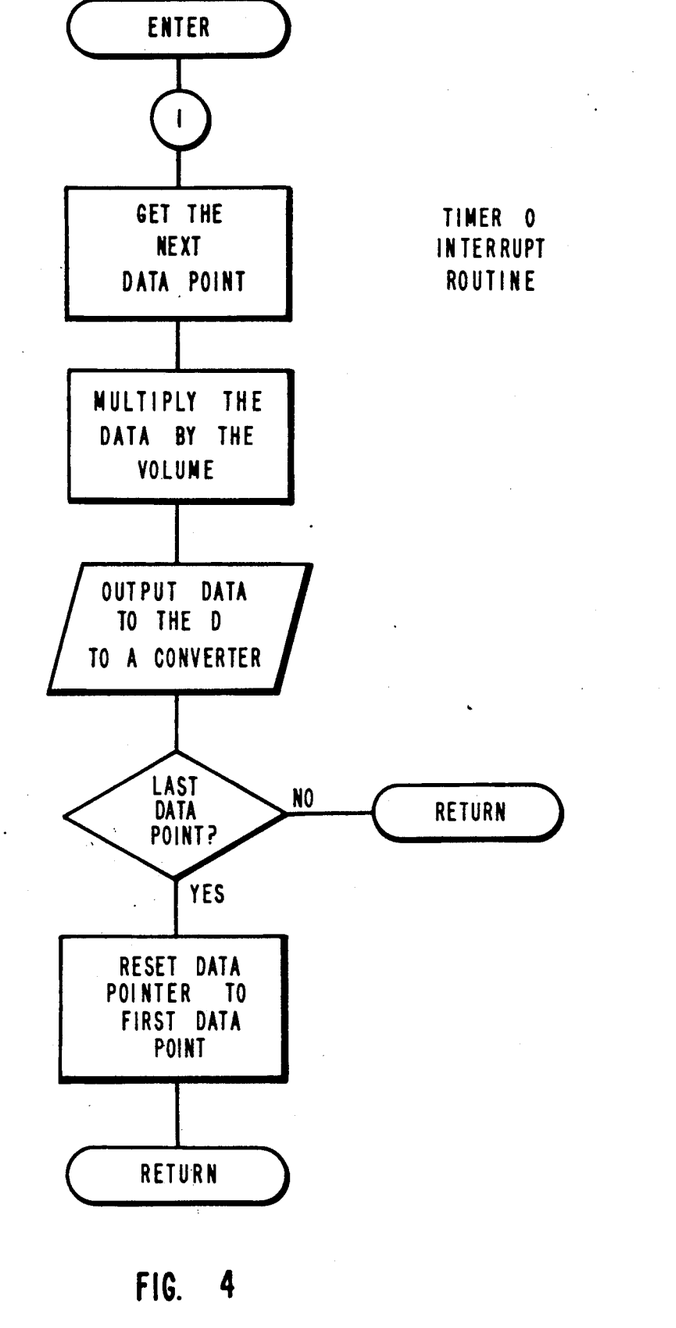
FIGS. 4–7 depict the flow charts of the logic steps of the software routines programmed into the apparatus in FIG. 2.

The first routine, called TIMER0 routine, is shown as a flow chart on FIG. 4. The first routine handles the output of digital data to the digital to analog converter. The digitally recorded sounds are stored in the EPROM. This routine is interrupt driven, i.e., at variable intervals the microprocessor retrieves a data point from the EPROM, multiplies the data point by the volume and sends the information to the digital to analog converter. Here, the digitally recorded sound is converted into an analog signal which can be amplified to the speakers. This routine runs at an initial sample rate of 8 KHz but can be adjusted up or down. The timing is controlled by an 8 bit timer.

Figure 5:
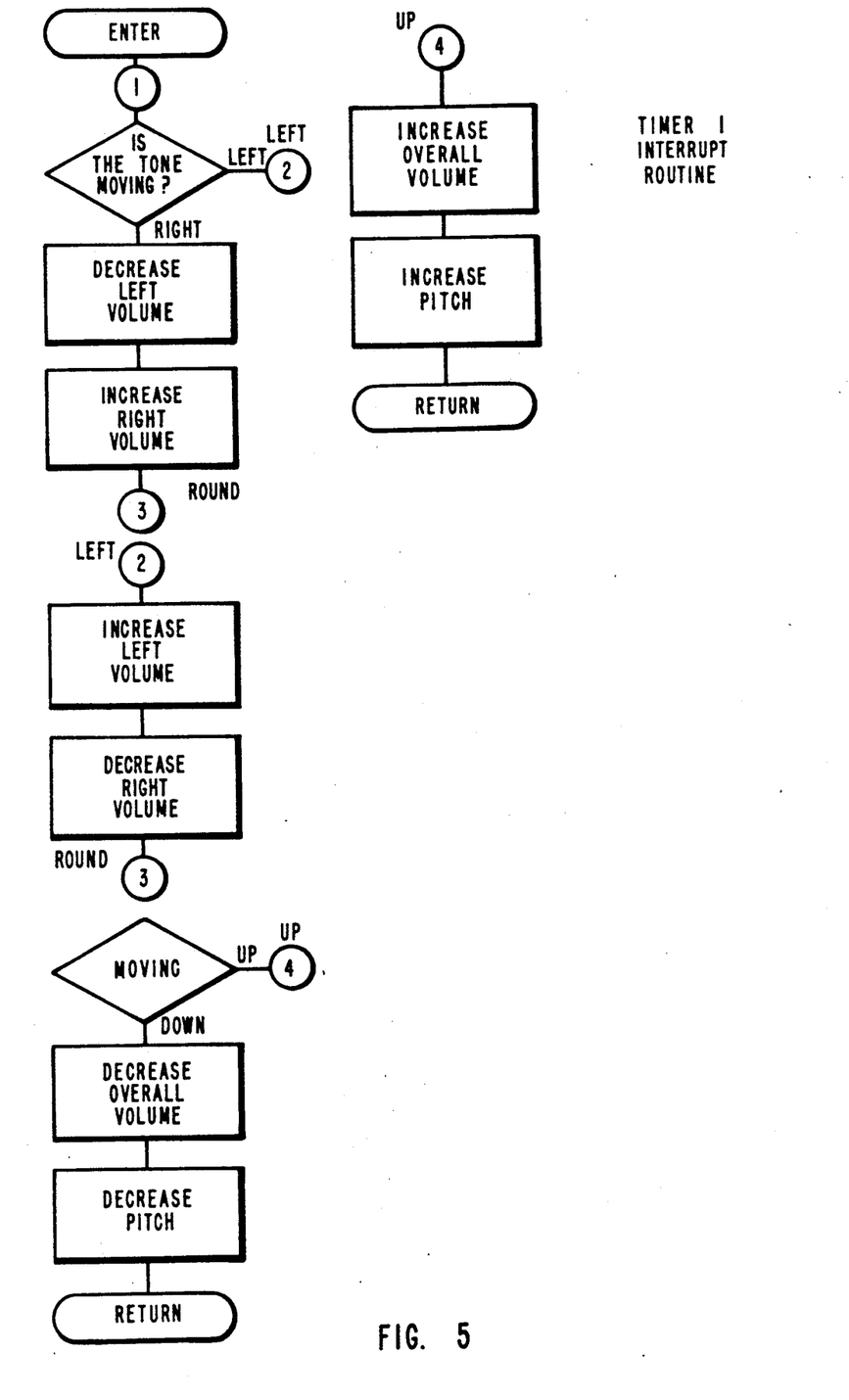

The second routine, called TIMER1 routine, is shown as a flow chart on FIG. 5. The second routine controls the right and left volume of the sound pattern, the current pitch of the sound pattern and the overall volume of the sound pattern. The changes in the relative right and left volume and pitch give the tone its apparent motion as a cyclic stereophonic sound pattern. In essence, the second routine controls the rate of cycles described above as "panning." In its current embodiment, one cycle of the tone consists of 500 steps. This invention is not, however, limited to any particular number of steps. The amount of time between steps controls the rate of the cycles. The shorter the time between steps, the faster the rate. The initial time between steps is set at 6 ms but can be adjusted up or down. The second routine gives the moving tone its apparent eliptical or round configuration. As the tone is panned from the left to the right, the pitch and overall volume are increased until the tone is half way between the speakers (i.e., the "top"). As the tone passes the halfway point, the overall volume and the pitch are decreased until the tone is panned back to the halfway point (i.e., the "bottom"). Then the cycle starts over again. This routine is also interrupt driven and is generated by a second on chip timer.

Figure 6:
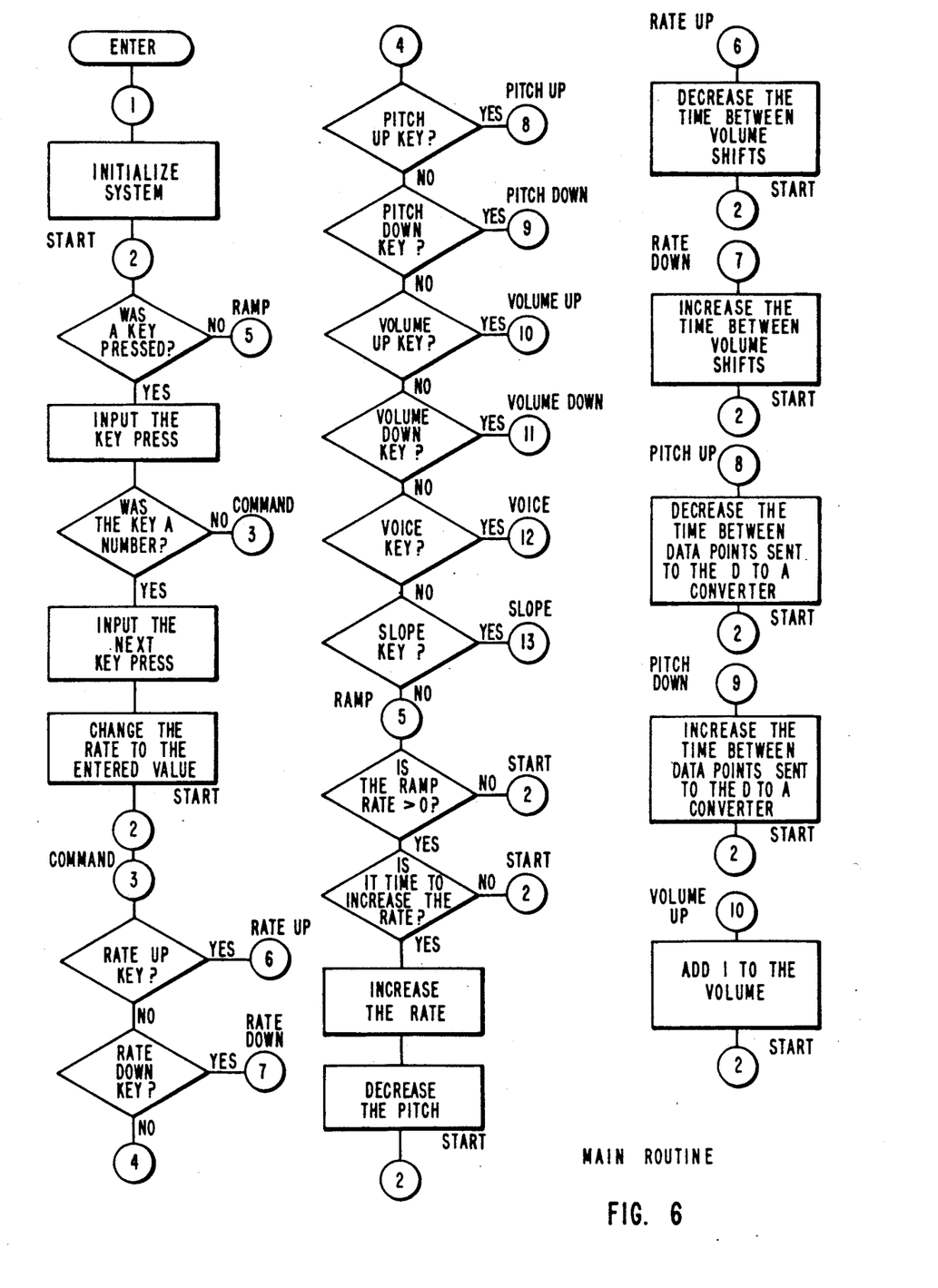
Figure 7:
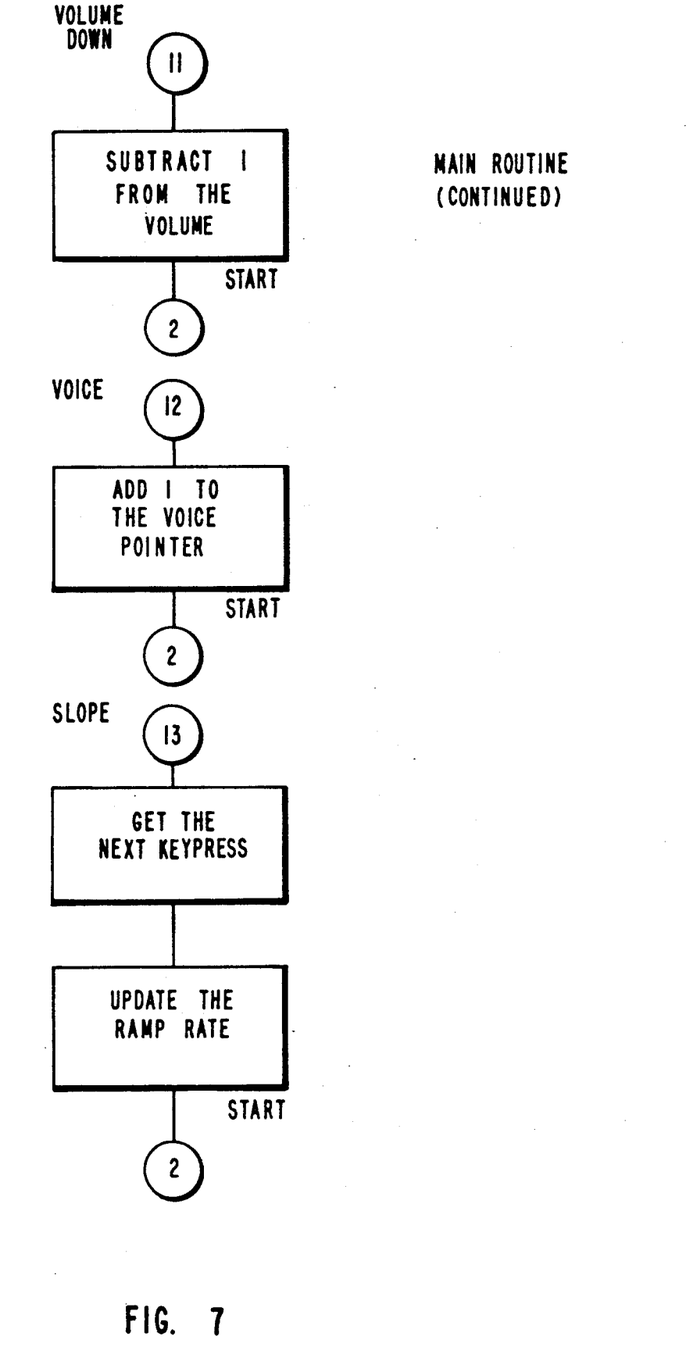

The third, or main routine, is shown as a flow chart on FIG. 6 and 7. The main routine runs constantly while the inventive apparatus is in use. The main routine polls the Keypad for user interaction. This polling is done as an x-y matrix. A press on the Keypad sends an electrical signal which is read by the microprocessor. The main routine also controls the overall volume of the sound pattern. The main routine controls any changes in the first and second routines. By use of the main routine, the pitch of the tone can be changed by instructing the first routine to sample the digitally recorded sounds and send them to the digital to analog converter more frequently. This raises the pitch of the sound pattern. Conversely, if a lower pitch is desired, the first routine is instructed to sample the digitally recorded sounds and send them to the digital to analog converter less frequently.

The main routine also controls the rate of cycles by varying the timing intervals of the second routine. The main routine can adjust the time intervals between the steps in the second routine. By reducing or increasing the time between the steps, the rate of cycles is increased or decreased.

Finally, the main routine controls the "slope" function of the invention. A "slope" occurs when the pitch is decreased in the first routine and the rate is increased in the second routine. The main routine has several preset "slopes" programmed into the EPROM. These are activated by the Keypad. In its current configuration, nine separate slopes are available, but the invention is not limited to this number of slopes. In the preferred embodiment, the rates of increase of the cycles range from an increase of one cycle per minute occurring every minute to an increase of one cycle per minute occurring every seven seconds. In each slope, the pitch of the sound pattern is gradually reduced as the rate increases. Thus, the reader perceives a less noticeable change in the rate of cycles.

A copy of the computer program executed by he microprocessor is deposited herewith and is incorporated herein as part of this disclosure and specification.

In the preferred practice of this invention, the listener activates the inventive apparatus and places on the headphones. The reader selects a voice by manually pressing the Keypad until a preferred voice from the prerecorded voices is obtained. The listener may then select a constant rate of cycles of the sound pattern and begin to read. In the alternative, listener may select a starting rate of cycles of the sound pattern and a slope from one of the nine available slopes. The apparatus will automatically increase the rate of cycles of the chosen slope while simultaneously lowering the pitch of the voice. To change the volume, the rate of cycles, the slope, the voice or the pitch of the voice, the listener need only press the appropriate keys on the Keypad.

The foregoing description of this invention so fully reveals the general nature of this invention that others can, by applying current knowledge, readily modify such description and/or adapt it for various applications without departing from the generic concept, and therefore, such adaptations and modifications should and are intended to be comprehended within the meaning and range of equivalents of the following claims, which claims define subject matter regarded to be our invention.

I claim:

1. A reading method to be employed by a reader comprising listening to a cyclic stereophonic sound pattern having a pitch while reading text; wherein said cyclic stereophonic sound pattern has been created by panning a recorded continuous sound source from left to right and from right to left to create a cyclic stereophonic sound pattern comprised of a "left to right then right to left" auditory cycle; and wherein said cyclic stereophonic sound pattern paces the reader's eye movement over the text in a "left to right then right to left" manner; and wherein the pitch of said cyclic stereophonic sound pattern is adjusted.

2. A reading method in accordance with claim 1 wherein said pitch is lowered while the reader reads the text.

3. A reading method in accordance with claim 2 wherein the rate of said cyclic stereophonic sound pattern remains constant.

4. A reading method in accordance with claim 2 wherein the rate of said cyclic stereophonic sound pattern increases.

5. A reading method in accordance with claim 1 wherein the rate of said cyclic stereophonic sound pattern remains constant.

6. A reading method in accordance with claim 1 wherein the rate of said cyclic stereophonic sound pattern is increased.

7. A reading improvement apparatus to be used by a reader of text comprising (a) a cyclic stereophonic sound pattern having a pitch; (b) a listening means for the reader to listen to said cyclic stereophonic sound pattern; (c) a means for adjusting the pitch of said sound pattern; wherein said cyclic stereophonic sound pattern has been created by panning a recorded continuous sound source; wherein said stereophonic sound pattern is comprised of a "left to right then right to left" auditory cycle; and wherein said sound pattern is adapted to pace eye movement over said text in a "left to right then right to left" manner.

8. Reading improvement apparatus in accordance with claim 7 further comprising a means for adjusting the rate of said cyclic stereophonic sound pattern.

9. Reading improvement apparatus in accordance with claim 8 wherein the means for adjusting the rate of said cyclic stereophonic sound patterns comprises audio tapes wherein said sound patterns are prerecorded on said tape and wherein the rate of said cyclic stereophonic sound pattern, also prerecorded on the tape, increases.

10. Reading improvement apparatus in accordance with claim 8 wherein the means for adjusting the rate of said cyclic stereophonic sound pattern comprises a microprocessor adapted to increase the rate of said cyclic stereophonic sound pattern.

11. Reading improvement apparatus in accordance with claim 10 wherein the means for adjusting the rate of the sound pattern is manually controlled.

12. Reading improvement apparatus in accordance with claim 10 wherein the means for adjusting the rate of the sound pattern is programmed in said microprocessor to occur automatically.

13. Reading improvement apparatus in accordance with claim 10 further comprising a means for changing the voice of said sound pattern.

14. Reading improvement apparatus in accordance with claim 10 further comprising a means for changing the volume of said sound pattern.

15. Reading improvement apparatus in accordance with claim 7 wherein the means for adjusting the pitch comprises an audio tape player and an audio tape wherein said sound pattern and said pitch are prerecorded on said tape; and wherein said prerecorded pitch decreases as said tape is played by said audio tape player.

16. Reading improvement apparatus in accordance with claim 7 wherein the means for adjusting the pitch comprises a microprocessor adapted to lower the pitch of the sound pattern.

17. Reading improvement apparatus in accordance with claim 16 wherein said means for adjusting the pitch is manually controlled.

18. Reading improvement apparatus in accordance with claim 16 wherein the means for adjusting the pitch is programmed in said microprocessor to occur automatically.

19. Reading improvement apparatus in accordance with claim 16 further comprising the means for changing the voice of said sound pattern.

20. Reading improvement apparatus in accordance with claim 16 further comprising a means for changing the volume of said sound pattern.

21. Reading improvement apparatus comprising a cyclic stereophonic sound pattern recorded in a medium from which said sound pattern can be listened to by a reader of text either directly or with the aid of a machine; wherein said cyclic stereophonic sound pattern has been created by panning a continuous sound source; wherein said cyclic stereophonic sound pattern is comprised of a "left to right then right to left" auditory cycle which is repeated when listened to by said reader; wherein said cyclic stereophonic sound pattern is adapted to pace said reader's eye movement over said text; and said apparatus further comprising means for adjusting the pitch of said sound pattern.

22. Reading improvement apparatus in accordance with claim 21 wherein the pitch of said sound pattern is lowered.

23. Reading improvement apparatus in accordance with claim 22 wherein the rate of said cyclic stereophonic sound pattern is increased.

24. Reading improvement apparatus in accordance with claim 22 wherein the rate of said cyclic stereophonic sound pattern remains constant.

25. Reading improvement apparatus in accordance with claim 21 wherein the rate of said cyclic stereophonic sound pattern is increased.

26. Reading improvement apparatus in accordance with claim 21 wherein the rate of said cyclic stereophonic sound pattern remains constant.

* * * * *